(12) United States Patent
Tarokh et al.

(10) Patent No.: US 7,061,854 B2
(45) Date of Patent: Jun. 13, 2006

(54) EFFICIENT OFDM COMMUNICATIONS WITH INTERFERENCE IMMUNITY

(75) Inventors: Vahid Tarokh, Belmont, MA (US); Tharmalingam Ratnarajah, Kanata (CA); Wen Tong, Ottawa (CA)

(73) Assignee: Nortel Networks Limited, St. Laurent (CA)

( * ) Notice: Subject to any disclaimer, the term of this patent is extended or adjusted under 35 U.S.C. 154(b) by 948 days.

(21) Appl. No.: 09/977,540

(22) Filed: Oct. 15, 2001

(65) Prior Publication Data

US 2003/0072258 A1     Apr. 17, 2003

(51) Int. Cl.
*H04J 11/00*       (2006.01)

(52) U.S. Cl. ............ 370/206; 370/210; 375/299; 375/349

(58) Field of Classification Search ........ 370/203, 370/206, 208, 210, 310; 375/144, 148, 299, 375/346, 347, 349
See application file for complete search history.

(56) References Cited

U.S. PATENT DOCUMENTS

| | | | | |
|---|---|---|---|---|
| 5,506,836 | A | 4/1996 | Ikeda et al. | 370/19 |
| 5,867,478 | A | 2/1999 | Baum et al. | 370/203 |
| 6,542,556 | B1 * | 4/2003 | Kuchi et al. | 375/299 |
| 6,751,187 | B1 * | 6/2004 | Walton et al. | 370/210 |
| 6,751,269 | B1 * | 6/2004 | Shalvi et al. | 375/298 |
| 6,771,706 | B1 * | 8/2004 | Ling et al. | 375/267 |
| 6,834,043 | B1 * | 12/2004 | Vook et al. | 370/310 |
| 6,850,481 | B1 * | 2/2005 | Wu et al. | 370/208 |
| 6,853,629 | B1 * | 2/2005 | Alamouti et al. | 370/330 |
| 2002/0041635 | A1 * | 4/2002 | Ma et al. | 375/267 |
| 2002/0118765 | A1 * | 8/2002 | Nangia et al. | 375/260 |
| 2002/0181390 | A1 * | 12/2002 | Mody et al. | 370/208 |
| 2003/0072452 | A1 * | 4/2003 | Mody et al. | 380/274 |
| 2003/0169681 | A1 * | 9/2003 | Li et al. | 370/203 |

OTHER PUBLICATIONS

Tarokh, V., Jafarkhani, H., and Calderbank, A.R., "Space-time block codes from orthogonal designs," IEEE Trans. Inform. Theory, vol. 45, No. 5, pp. 1456-1467, Jul. 1999.
Tarokh, V., Seshadri, N., and Calderbank, A.R., "Space-time codes for high data rate wireless communication: performance analysis and code construction," IEEE Trans. Inform. Theory, pp. 744-765, Mar. 1998.

(Continued)

*Primary Examiner*—Min Jung
(74) *Attorney, Agent, or Firm*—Withrow & Terranova, PLLC

(57) ABSTRACT

The present invention relates to employing OFDM modulation in combination with spatial diversity and space-time block coding to provide high data rates and exceptional interference immunity. For transmission, quadrature modulated data is encoded in space and time to create individual series of encoded symbols. Each of these series of encoded symbols is subjected to a type of inverse Fourier Transform in corresponding transmission paths. In each transmission path, cyclic extensions may be appended to the resultant symbols, which are subsequently converted to an analog format, modulated, amplified, and transmitted from one of multiple antennas. Preferably, such communications are implemented from base stations to mobile terminals in an environment where the frequency reuse factor is approximately one and the base stations are synchronized to a common clock signal.

22 Claims, 5 Drawing Sheets

OTHER PUBLICATIONS

Alamouti, S.M., "A simple transmit diversity technique for wireless communications," IEEE Jounral on Selected Areas of Communications, vol. 16, No. 8, pp. 1451-1458, Oct. 1998.

Naguib, A.F., Seshadri N., and Calderbank, A.R., "Applications of space-time block codes and interference supression for high capacity and high data rate wireless systems," Thirty-Second Asilomar Conference on Signals, Systems & Computers, vol. 2, pp. 1803-1810, 1998.

van Nee, Richard, and Prasad, Ramjee, "OFDM For Wireless Multimedia Communications," pp. 33-51, Artech House Publishers, 2000, ISBN 0-89006-530-6.

* cited by examiner

EFFICIENT OFDM COMMUNICATIONS WITH INTERFERENCE IMMUNITY

FIELD OF THE INVENTION

The present invention relates to wireless communications, and in particular, to efficient orthogonal frequency division multiplexing (OFDM), which is substantially resistant to interference and fading.

BACKGROUND OF THE INVENTION

The most significant source of noise in a cellular system is interference. In the absence of out-of-cell and inter-cell interference, the theoretical capacity of wireless systems is extremely large, limited only by the thermal noise. As such, there is a need for technology capable of rejecting out-of-cell interference.

For any receiver, interference can be either caused by out-of-cell transmitters operating on the same frequency, or by transmitter(s) operating in the same cell, such as that found in code division multiple access (CDMA). On some occasions, echoes of the signal destined to a user can cause interference, which is often referred to as inter-symbol interference (ISI). This scenario will be referred to in general as self-interference. In other cases, signals destined to other receivers are the cause of interference.

A standard approach to combat interference is to share time, frequency, and spatial resources amongst different users. An example is "frequency planning," where neighboring cells do not operate on the same frequency at the same time. This approach is employed in current time division multiple access (TDMA) systems, but is far from being efficient as it suffers a significant bandwidth penalty.

An interesting approach to combat interference in cellular systems is multi-user detection (MUD) in combination with CDMA. This is difficult to implement at the receiver end, since transmissions from different base stations do not arrive synchronously at the receiver. Moreover, the mobile terminals are usually small and power limited, making it difficult to implement algorithms requiring the large amount of computations typically required in MUD techniques.

CDMA technology suffers from self-interference and the interference from the signals destined to other users within a single cell. This can be overcome to some extent if the transmission sequences for different users within a cell are orthogonal, as is the case in high data rate (HDR) systems. However, out-of-cell interference remains a major issue. In HDR systems, more than half of the users experience signal to interference plus noise ratios (SINR) of less than zero dB. This interference limits the data rates that can be provided to these users if the system treats the interference as noise.

An efficient cellular system should enjoy a frequency reuse factor equal to one, meaning that all the available bandwidth is used in every cell. Such an implementation reduces the signal-to-noise ratio (SNR) of the users closer to the edge, or border, of each cell. For these mobile terminals at or near the border of adjacent cells, the desired signal from a servicing base station has almost the same power as the signals transmitted from the neighboring base stations, since the distances of the mobile terminal from the base stations are almost equal. If the interference is treated as noise, this low SINR limits the data rate that can be provided to these remote units. Because of the fairness factor of the system, admission of these mobile terminals into the system will limit maximum through-put. Hence, even those mobile terminals enjoying strong SINR will be penalized. The result is a highly inefficient system.

It may seem that the aforementioned problem can be overcome by rejecting the users with low SINR. However, this is not a practical solution, as any commercial wireless data solution has to be able to provide services to users at any location in the cell. In this light, a solution must be provided that improves the data rate of the users at the edge of each cell even in the presence of strong interference.

Another major impairment to a wireless channel is fading. Fading is caused by the destructive addition of the reflections of the desired signal. When a receiver is in fade, it cannot receive the desired signal. Given these issues there is a need for an efficient communication system capable of combating interference and fading in an effective manner while maintaining high data rates.

SUMMARY OF THE INVENTION

The present invention relates to employing OFDM modulation in combination with spatial diversity and space-time block coding to provide high data rates and exceptional interference immunity. For transmission, quadrature modulated data is encoded in space and time to create individual series of encoded symbols. Each of these series of encoded symbols is subjected to a type of inverse Fourier Transform in corresponding transmission paths. In each transmission path, cyclic extensions may be appended to the resultant symbols, which are subsequently converted to an analog format, modulated, amplified, and transmitted from one of multiple antennas. Preferably, such communications are implemented from base stations to mobile terminals in an environment where the frequency reuse factor is approximately one and the base stations are synchronized to a common clock signal.

Receivers in the communication system will initially receive signals simultaneously from multiple antennas associated with multiple receiving paths and demodulate the signals in each of the receiving paths to recover a series of inverse Fourier Transform (IFT) symbols. Next, a type of Fourier Transform is performed on each of the series of IFT symbols to provide a series of encoded symbols, which will typically be mixed with interfering signals during propagation. The receiver will estimate each of the series of encoded symbols and cancel the interfering signals to recover each of the series of encoded symbols.

Each of the series of encoded symbols is then decoded based on space and time. Preferably space-time block coding and decoding is implemented during transmission and reception, respectively, wherein constellation position and timing of the symbols are affected during coding. Finally, the series of symbols is demodulated into data corresponding to that originally transmitted. Other coding schemes may be incorporated during transmission and reception to facilitate error correction and detection. The invention provides for efficient communications capable of combating interference and fading in an effective manner while maintaining high data rates.

Those skilled in the art will appreciate the scope of the present invention and realize additional aspects thereof after reading the following detailed description of the preferred embodiments in association with the accompanying drawing figures.

BRIEF DESCRIPTION OF THE DRAWING FIGURES

The accompanying drawing figures incorporated in and forming a part of this specification illustrate several aspects of the invention, and together with the description serve to explain the principles of the invention.

DETAILED DESCRIPTION OF THE PREFERRED EMBODIMENTS

Interference and fading are significant impediments to achieving high data rates in today's wireless communication systems. A resource to combat fading is called diversity. Diversity provides a replica of a desired signal to a receiver in another format. Potential diversity resources generally include:

temporal diversity, where another replica of the transmitted signal is sent to the receiver at another time;

frequency diversity, where another replica of the transmitted signal is sent to the receiver in another frequency; and spatial diversity, where multiple transmitter (Tx) and receiver (Rx) antennas are used for sending/receiving another replica of the transmitted signal.

Temporal and frequency resources are precious. In this light, spatial diversity is preferred, as it does not inflict time and frequency penalties. However, there is a cost penalty. In order to benefit from spatial diversity, receiver antennas should not be too close to each other or else one must use a different polarization. Similarly, there must be a reasonable distance between transmitter antennas. Because of the limitation on the size of mobile terminals, only a limited number of receiver antennas can be used. The deployment of multiple transmitter antennas is easier, as the cost of deployment can be amortized between many users. An aspect of the present invention is the use of multiple transmitter antennas at the base station and multiple receiver antennas at the mobile terminals, with the combination of appropriate coding techniques to significantly reduce the effect of fading.

In order to combine the benefit of multiple antennas with interference suppression, the present invention incorporates orthogonal frequency division multiplexing (OFDM) as the preferred transmission scheme. With OFDM, the frequency reuse factor is one. Such an implementation greatly reduces inter-symbol interference (ISI) as well as synchronization problems, and makes it much easier to implement multi-user detection (MUD). Accordingly, the present invention incorporates spatial diversity, MUD in an OFDM framework, and a frequency reuse factor of one to provide an efficient communication system capable of communicating at high data rates.

The embodiments set forth below represent the necessary information to enable those skilled in the art to practice the invention and illustrate the best mode of practicing the invention. Upon reading the following description in light of the accompanying drawing figures, those skilled in the art will understand the concepts of the invention and will recognize applications of these concepts not particularly addressed herein. It should be understood that these concepts and applications fall within the scope of the disclosure and the accompanying claims. A high level overview of the mobile terminals and base stations of the present invention is provided prior to delving into the structural and functional details of the preferred embodiments.

Figure 1:
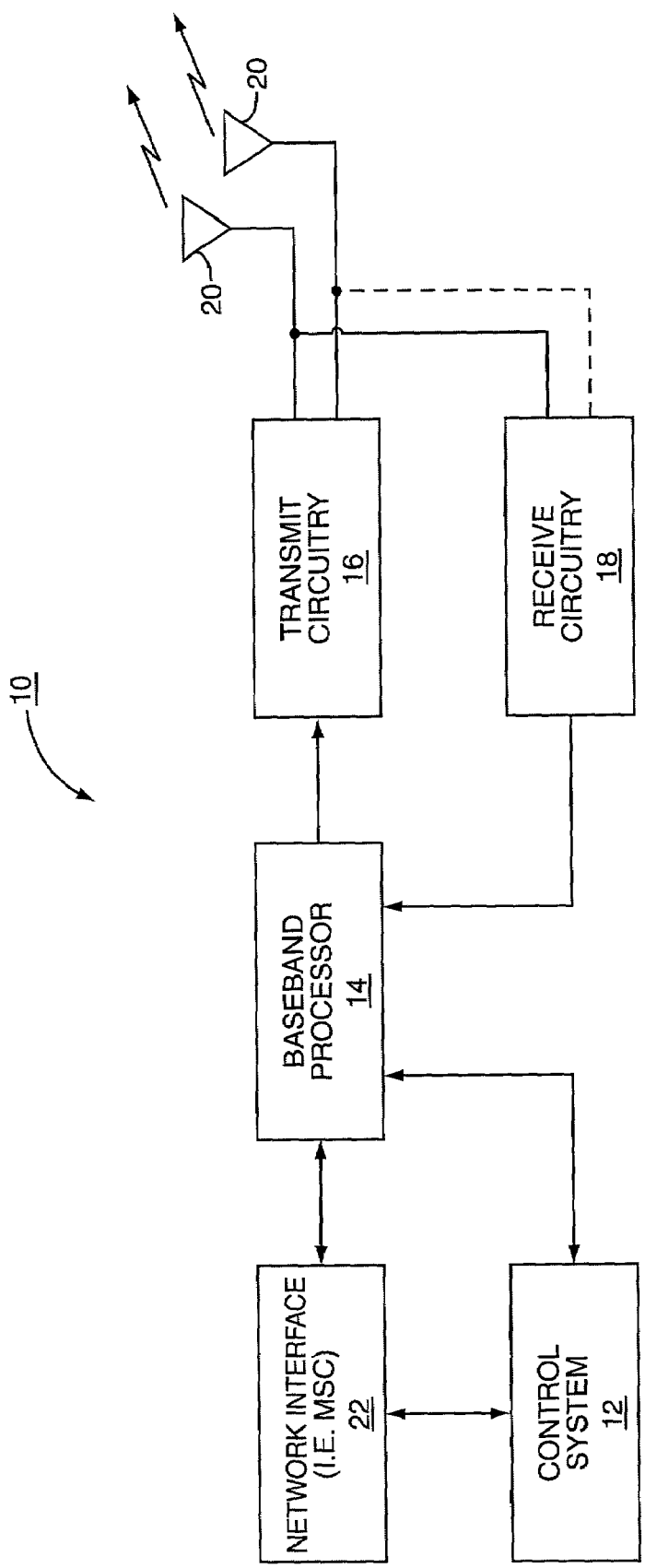
FIG. 1 is a block representation of a base station according to one embodiment of the present invention.

With reference to FIG. 1, a base station 10 configured according to one embodiment of the present invention is illustrated. The base station 10 generally includes a control system 12, a baseband processor 14, transmission circuitry 16, reception circuitry 18, multiple antennas 20, and a network interface 22. The reception circuitry 18 receives radio frequency signals bearing information from one or more remote transmitters provided by mobile terminals 24 (illustrated in FIG. 2). Preferably, a low noise amplifier and a filter (not shown) cooperate to amplify and remove broad band interference from the signal for processing. Downconversion and digitization circuitry (not shown) will then downconvert the filtered, received signal to an intermediate or baseband frequency signal, which is then digitized into one or more digital streams.

The baseband processor 14 processes the digitized received signal to extract the information or data bits conveyed in the received signal. This processing typically comprises demodulation, decoding, and error correction operations. As such, the baseband processor 14 is generally implemented in one or more digital signal processors (DSPs). The received information is then sent across a wireless network via the network interface 22 or transmitted to another mobile terminal 24 serviced by the base station 10. The network interface 22 will typically interact with a circuit-switched network forming a part of a wireless network, which may be coupled to the public switched telephone network (PSTN). For example, the network interface 22 may communicate with a mobile switching center (MSC) servicing multiple base stations 10.

On the transmit side, the baseband processor 14 receives digitized data, which may represent voice, data, or control information, from the network interface 22 under the control of control system 12, which encodes the data for transmission. The encoded data is output to the transmission circuitry 16, where it is used by a modulator (not shown) to modulate a carrier signal that is at a desired transmit frequency or frequencies. A power amplifier (not shown) will amplify the modulated carrier signal to a level appropriate for transmission, and deliver the modulated carrier signal to the antennas 20 through a matching network (not shown). Modulation and processing details are described in greater detail below.

Figure 2:
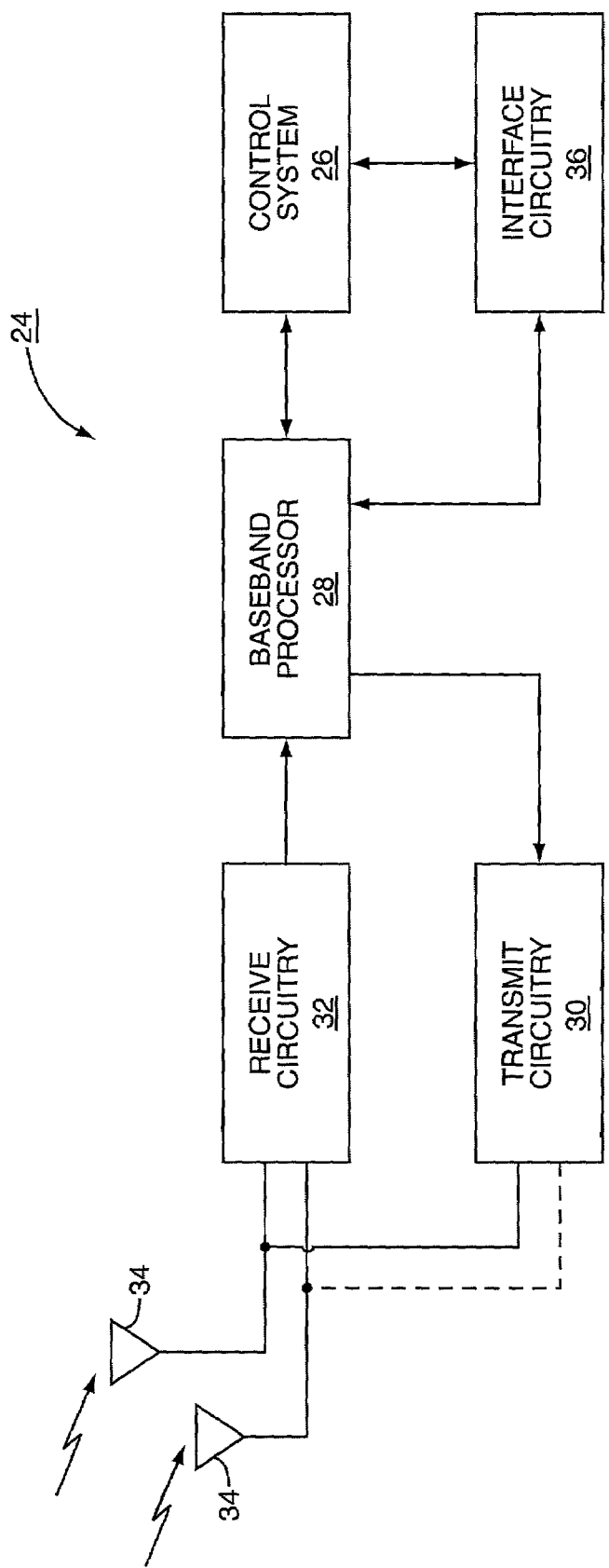
FIG. 2 is a block representation of a mobile terminal according to one embodiment of the present invention.

With reference to FIG. 2, a mobile terminal 24 configured according to one embodiment of the present invention is illustrated. Similarly to the base station 10, the mobile terminal 24 will include a control system 26, a baseband processor 28, transmission circuitry 30, reception circuitry 32, multiple antennas 34, and a user interface 36. The reception circuitry 32 receives radio frequency signals bearing information from one or more remote transmitters provided by base stations 10. Preferably, a low noise amplifier and a filter (not shown) cooperate to amplify and remove broad band interference from the signal for processing. Downconversion and digitization circuitry (not shown) will then downconvert the filtered, received signal to an intermediate or baseband frequency signal, which is then digitized into one or more digital streams.

The baseband processor 28 processes the digitized received signal to extract the information or data bits conveyed in the received signal. This processing typically comprises demodulation, decoding, and error correction operations as will be discussed on greater detail below. The baseband processor 28 is generally implemented in one or more digital signal processors (DSPs).

For transmission, the baseband processor 28 receives digitized data, which may represent voice, data, or control information, from the control system 26, which it encodes for transmission. The encoded data is output to the transmission circuitry 30, where it is used by a modulator to modulate a carrier signal that is at a desired transmit frequency or frequencies. A power amplifier (not shown) will amplify the modulated carrier signal to a level appropriate for transmission, and deliver the modulated carrier signal to the antennas 34 through a matching network. Various modulation and processing techniques available to those skilled in the art are applicable to the present invention.

The present operation uses OFDM in a communication system incorporating spatial diversity. Preferably, the frequency reuse is a factor of one and space-time coding, or the like, is used in association with cyclic extensions to facilitate rejection of out-of-cell interference. In OFDM modulation, the transmission band is divided into a multiple, orthogonal carrier waves. Each carrier wave is modulated according to the digital data to be transmitted. Because OFDM divides the transmission band into multiple carriers, the bandwidth per carrier decreases and the modulation time per carrier increases. Since the multiple carriers are transmitted in parallel, the transmission rate for the digital data, or symbols, on any given carrier is lower than when a single carrier is used.

OFDM modulation requires the performance of an Inverse Fast Fourier Transform (IFFT) on the information to be transmitted. For demodulation, the performance of a Fast Fourier Transform (FFT) on the received signal is required to recover the transmitted information. In practice, the Inverse Discrete Fourier Transform (IDFT) and Discrete Fourier Transform (DFT) are implemented using digital signal processing for modulation and demodulation, respectively.

In general, the characterizing feature of OFDM modulation is that orthogonal carrier waves are generated for multiple bands within a transmission channel. The modulated signals are digital signals having a relatively low transmission rate and are capable of staying within their respective bands. The individual carrier waves are not modulated directly by the digital signals. Instead, all carrier waves are modulated at once by IFFT processing.

In the preferred embodiment, OFDM is used at least for the downlink transmission from the base stations 10 to the mobile terminals 24. Further, the base stations 10 are synchronized to a common clock. Each base station 10 is equipped with n transmit antennas 20, and each mobile terminal 24 is equipped with m receive antennas 34. Notably, the respective antennas can be used for reception and transmission using appropriate duplexers or switches and are so labeled only for clarity.

Figure 3:
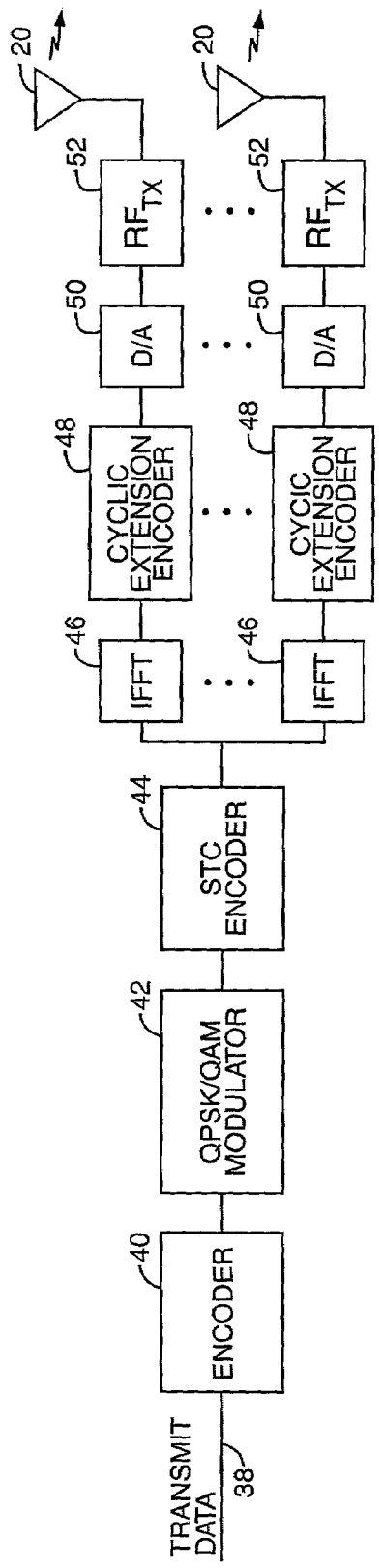
FIG. 3 is a block representation of transmission circuitry of a base station according to one embodiment of the present invention.

Reference is now directed to FIG. 3. OFDM transmission is accomplished using N tones. At each time t=0, T, 2T, ..., respective transmit data 38 in the form of data bits b(t) arrive at various base stations $B_l$, l=1,2, ..., L from the network interface 22 (FIG. 1) for modulation and transmission. The transmit data 38 is initially processed using an encoder 40 for basic error correction and sent to a modulator 42 for providing quadrature phase shift keying (QPSK), quadrature amplitude modulation (QAM), or like quadrature-based modulation. The encoder 40 may implement Turbo-code or like encoding and processing. The modulator 42 essentially converts groups of bits b(0), b(T), b(2T), into symbols representing locations in an amplitude and phase constellation. Accordingly, for each group of bits, the modulator 42 will select n blocks of N symbols for each time t=0, T, 2T, ... The symbols may be represented as follows $c_{1,i,B_l}(t)$, $c_{2,i,B_l}(t)$, ... $c_{N,i,B_l}(t)$ for each time t=0, T, 2T, ...

Each block of N symbols is processed by a space-time block code (STC) encoder 44, which modifies the symbols in a fashion making the transmitted signals more resistant to interference. The STC encoding is a relatively simple and linear coding technique, which is readily decoded at a receiver. See A. F. Naguib, N. Seshadri, and A. R. Calderbank, "Applications of space-time codes and interference suppression for high capacity and high data rate wireless systems," Thirty-Second Asilomar Conference on Signals, Systems & Computers, Volume 2, pp. 1803–1810, 1998, which is incorporated herein by reference in its entirety.

For example, assume the base station 10 has two antennas (n=2) and is configured to transmit data using $2^b$ symbols in the constellation. Although additional coding schemes can be concatenated with the transmission strategy described below, only an uncoded case is described for clarity, because the coded case is straightforward.

At times t=0, 2T, 4T ..., a block of 2bN bits b(t) arrives at the STC encoder of a base station $B_l$ (10). These 2bN bits pick up two blocks of length N symbols $s_{1,1,B_l}(t)$, $s_{2,1,B_l}(t)$, ... $s_{N,1,B_l}(t)$ and $s_{1,2,B_l}(t)$, $s_{2,2,B_l}(t)$, ... $s_{N,2,B_l}(t)$. The STC encoder 44 lets:

$$c_{i,1,B_l}(t) = s_{i,1,B_l}(t), \text{ and} \qquad \text{Eq. 1}$$

$$c_{i,2,B_l}(t) = s_{i,2,B_l}(t), \qquad \text{Eq. 2}$$

for t=0, 2T, 4T ... and i=1, 2, ... N. Next, the STC encoder 44 lets:

$$c_{i,1,B_l}(t) = -s^*_{i,2,B_l}(t-T), \text{ and} \qquad \text{Eq. 3}$$

$$c_{i,2,B_l}(t) = s^*_{i,1,B_l}(t-T), \qquad \text{Eq. 4}$$

for t=T, 3T, 5T ... and i=1, 2, ... N. The "*" is used to represent the complex conjugate. Thus, when n=2, the STC encoder 44 will receive a pair of symbols S1 and S2 and create four symbols S1, S2, −S2*, and S1*.

Each of the symbols provided by the STC encoder 44 are alternately sent to the respective IFFT processors 46, which are illustrated separately for ease of understanding. Those skilled in the art will recognize that one or more processors may be used to provide such digital signal processing alone or in combination with other processing described herein. The IFFT processors 46 will preferably operate on the respective symbols using an IDFT or like processing to effect an inverse Fourier Transform. Accordingly, one IFFT processor 46 will process symbols S1 at t=0 and −S2* at t=1 while the other IFFT processor 46 will concurrently process symbols S2 at t=0 and S1* at t=1. The output of the IFFT processors 46 provides symbols in the time domain.

The respective streams of time domain symbols provided by the IFFT processing are sent to cyclic extension encoders 48, which append cyclic extensions of length M to the resultant symbols. The resultant symbols with their cyclic extensions are converted to an analog format using digital-to-analog (D/A) converters 50 before being modulated and amplified for transmission by the radio frequency (RF) transmission circuitry 52. Finally, the respective OFDM signals are simultaneously transmitted from the antennas 20. Preferably, the transmitted data is preceded by pilot signals, which are known by the intended receiver. The receiver, which is discussed in detail below, will use the pilot signals for channel estimation and interference suppression.

Figure 4:
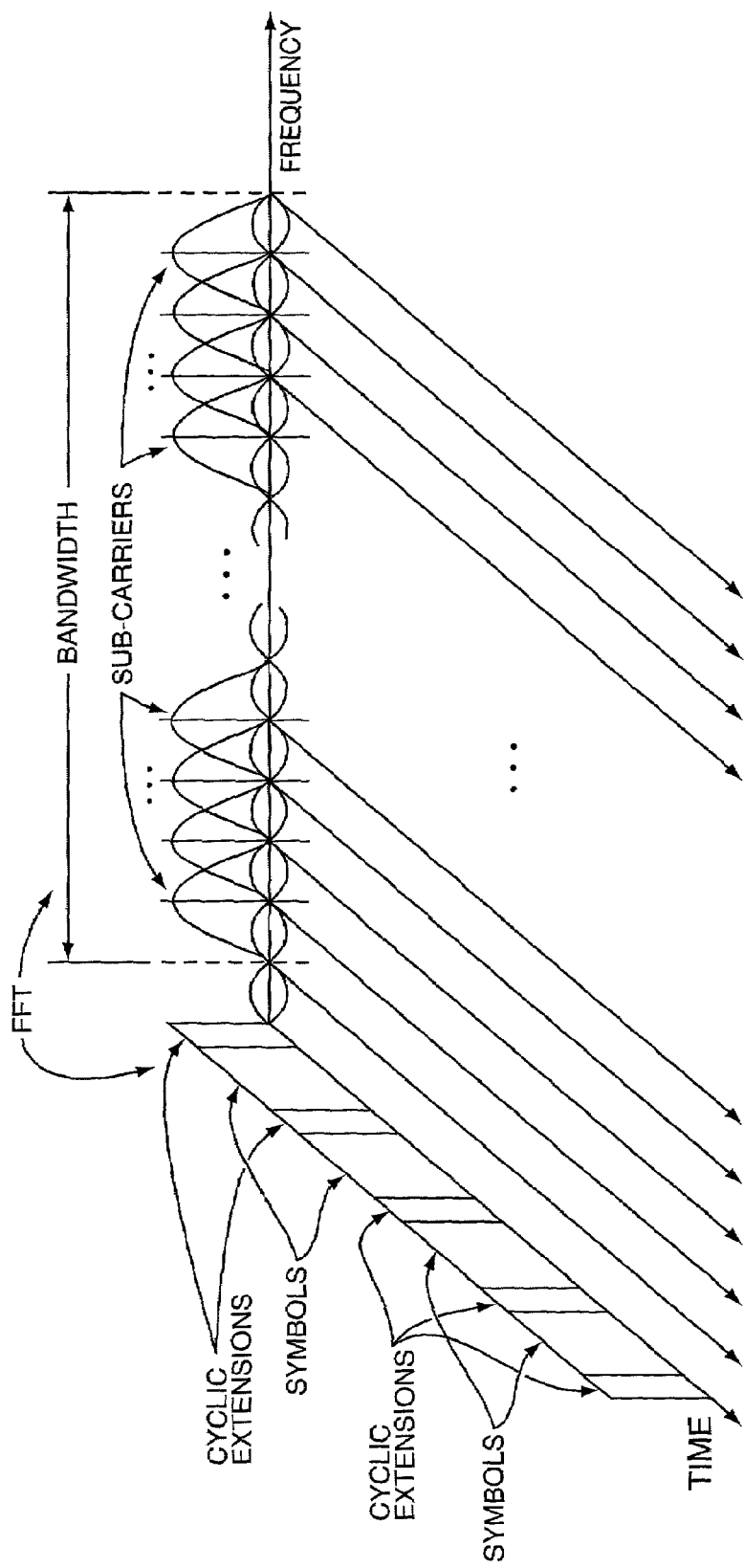
FIG. 4 is a graphical representation of time versus frequency for OFDM according to one embodiment of the present invention.

A time-frequency representation of OFDM is illustrated in FIG. 4 wherein the symbols are effectively extended using cyclic extensions. For the following description, assume that each OFDM symbol has a duration T and the time length of the cyclic extension in each OFDM symbol is v. The cyclic extensions effectively lengthen the symbols to minimize the impact of multi-path interference. As such, the cyclic extensions should have a time length greater than anticipated multi-path delays.

Figure 5:
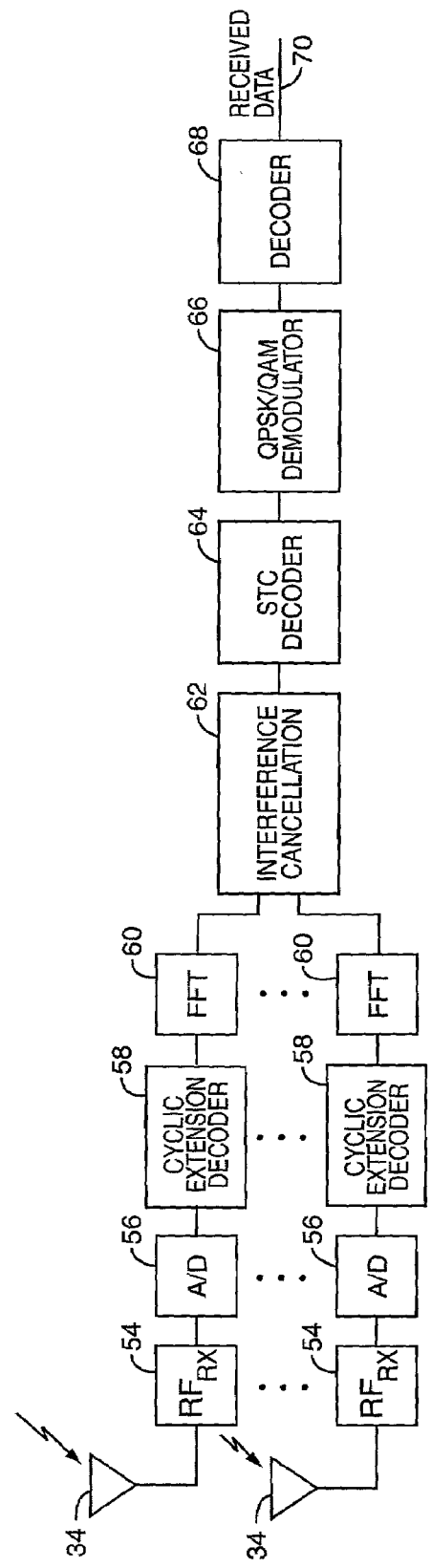
FIG. 5 is a block representation of receiving circuitry of a mobile terminal according to one embodiment of the present invention.

Reference is now made to FIG. 5. Upon arrival of the transmitted signals at each of the antennas 34 of the mobile terminal 24, the signals are down-converted and amplified by the RF receive circuitries 54. Analog-to-digital (A/D) converters 56 then digitize these analog signals for digital processing. The digital signals are sent to cyclic extension decoders 58 to remove the cyclic extensions appended to the symbols during transmission. Respective FFT processors 60 operate to facilitate a Fourier Transform on the digitized signals. The transform is preferably accomplished using a Discrete Fourier Transform.

At this point, the parallel receiving paths are sent to interference cancellation circuitry 62. In operation, channel responses are estimated from pilot signals, or training signals, embedded in the transmitted signals. The interference cancellation circuitries 62 are configured to know what transmitted pilot signals to expect, and by comparing the expected pilot signals with pilot signals actually received, at least a squared channel estimator can estimate the channel response.

Typically, all of the base stations 10 are transmitting different information signals. However, these base stations 10 are transmitting at the same time and using the same frequencies as their neighboring base stations, which causes interference. Accordingly, the mobile terminal 24 must estimate the particular information (desired information) signal that is transmitted from the base station 10.

To accomplish this, the interference cancellation circuitry 62 first estimates the channel responses of the desired signal and the interfering signals, using the pilot signal transmitted from the base stations 10. Then, using this channel response knowledge, the interference cancellation circuitry 62 is able to estimate the desired signals while suppressing the unwanted interfering signals. Once a signal is detected, interfering signals may be suppressed or cancelled as described below.

After the cyclic extensions have been removed and the FFT processors 60 have processed the remaining N samples, the output of the FFT processors 60 may be represented by:

$$r_{k,j,B_l}(t) = \sum_{i=1}^{n} \alpha_{i,j,B_l}(t) c_{k,i,B_l}(t) + \eta_{k,j}(t); \ j = 1, \ldots, m; \quad \text{Eq. 5}$$

assuming the delay spread of the channel is less than v and the k-th output of the FFT processors 60 for the chain j of received symbols is $r_{k,j,B_l}(t)$. Further, assume that $\alpha_{k,j,B_l}(t)$ is constant and is a complex number representing the total effect of the channel from antenna i of base station $B_l$ to receive antenna j of the mobile terminal 24 at time t. Finally, assume $\eta_{k,j}(t)$ represents Gaussian noise. A detailed discussion relating to suppressing interference from other base stations follows.

Figure 6:
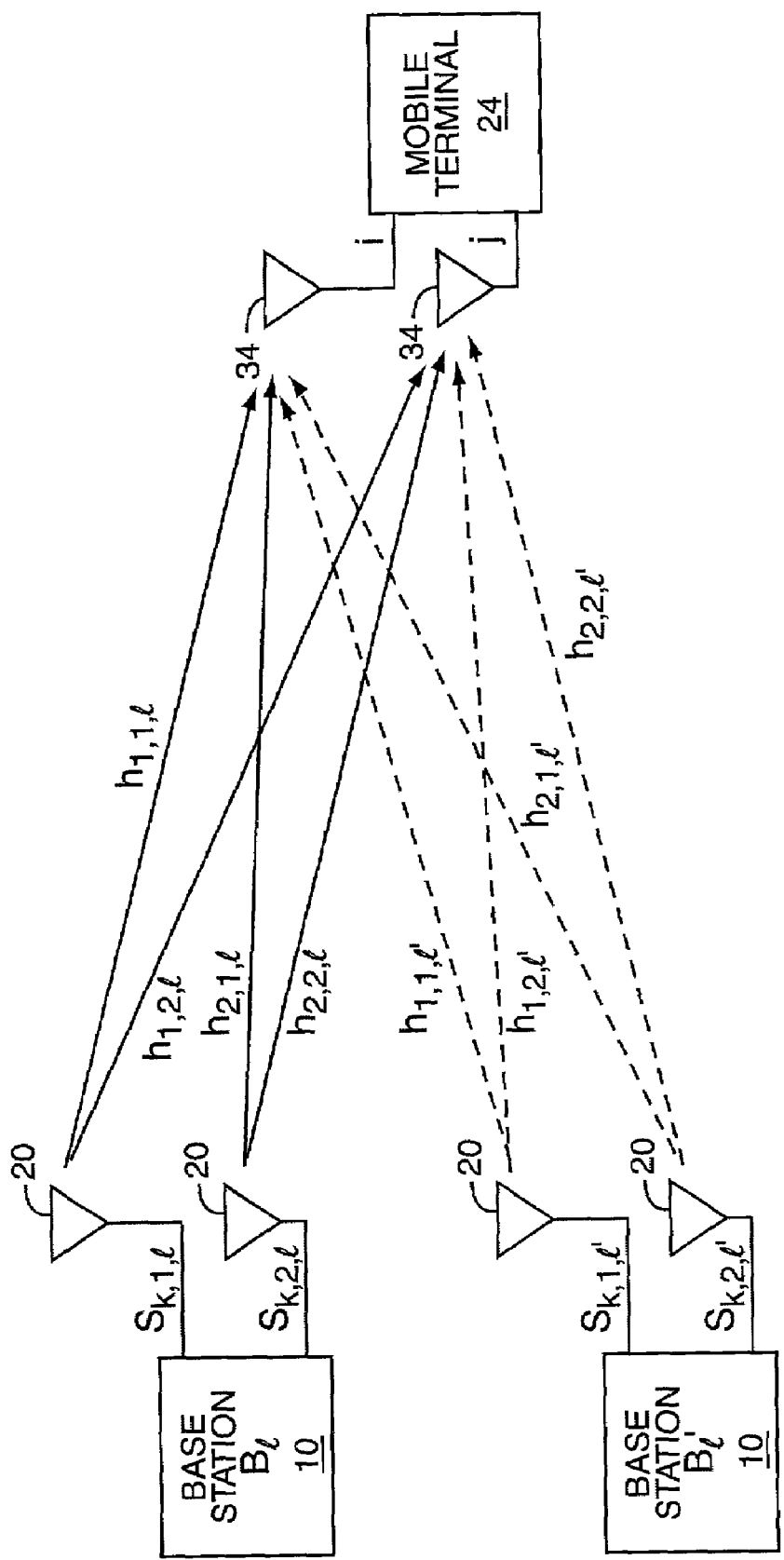
FIG. 6 is a block representation of a communication environment containing a mobile terminal and two base stations, which are configured according to one embodiment of the present invention.

Reference is now made to FIG. 6. A wireless channel is linear and signals transmitted from different base stations 10 will be superimposed linearly in the transmission media. Assume the mobile terminal 24 is synchronized to the transmissions from base station $B_l$. Because the distance of the mobile terminal 24 from the base station $B_{l'}$ and base station $B_l$ are different, there is a time difference tl' between the time that it takes for the electromagnetic waves to travel from the respective base stations $B_l$ and $B_{l'}$ to the antennas 34 of the mobile terminal 24. Because the time difference tl', signals from the transmit chains i=1, 2, . . . n of base station $B_{l'}$ arrive within at most the time period tl'+Δ(i,j,$B_{l'}$) for i=1, 2, . . . n from the sampling instances at the receive chain j. Provided that tl'+Δ(i,j,$B_{l'}$) is less than or equal to v, for i=1, 2, . . . n, the contribution of the signals transmitted from base station $B_{l'}$ to the k-th output of the FFT processors 60 of the receive chain j is given by:

$$r_{k,j,B_{l'}}(t) = \sum_{i=1}^{n} \alpha_{i,j,B_{l'}}(t) c_{k,i,B_{l'}}(t); \ j = 1; 2; \ldots; m, \quad \text{Eq. 6}$$

where $\alpha_{i,j,B_{l'}}(t)$ is a complex number representing the total effect of the channel from a first transmit antenna i(20) of base station $B_{l'}$ to a first antenna j(34) of mobile terminal 24 at time t. It is assumed that $\alpha_{i,j,B_{l'}}$ is constant during transmission of a symbol.

If the mobile terminal 24 is near the boundary of a neighboring cell serviced by base stations $B_j$ and $B_{l'}$, the distance between the mobile terminal 24 and the respective base stations may be roughly the same. As such, the time difference tl' is small. This means that if base stations $B_j$ and $B_{l'}$ and the mobile terminal 24 are designed such that the duration of the cyclic prefix is slightly larger than the typical delay spreads observed in the propagation environment, the contribution of the signals transmitted from base stations $B_{l'}$ to the k-th output of the receive chain j is represented by the above Equation 6. The contributions of the base stations 10 far from the mobile terminal 24 are small, and thus, the k-th output of the FFT processors 60 of the receive chain j is approximately represented by:

$$r_{k,j}(t) = \sum_{i=1}^{n} \alpha_{i,j,B_l}(t) c_{k,i,B_l}(t) + \quad \text{Eq. 7}$$

-continued $$\sum_{B_{l'}} \sum_{i=1}^{n} \alpha_{i,j,B_{l'}}(t) c_{k,i,B_{l'}}(t) + \eta_{k,j}(t)$$

where $B_{l'}$ runs in the set of all neighboring base stations of base station $B_{l'}$.

The preceding equation is notable because the interference and the desired signal are synchronized for this OFDM system, unlike competing code division multiple access (CDMA) systems. As such, OFDM appears to be a much more appropriate framework for MUD and interference suppression techniques than does CDMA.

Whenever the mobile terminal 24 is much closer to base station $B_l$ than base station $B_{l'}$ or other base stations 10, the interference is relatively small and may be treated as noise. The interference cancellation circuitry 62 will implement the above processing to substantially cancel unwanted signals from the incoming signal and provide an output to an STC decoder 64, which provides space-time block decoding to recover the original, modulated symbol stream. The modulated symbol stream is demodulated using demodulator 66 and decoded as necessary by decoder 68. The decoder 68 will support the encoding provided by the base station's encoder 40 to recover the received data 70, which corresponds to the transmit data 38. Further, detail is now provided regarding the STC decoder 64.

The STC decoder 64 effectively decodes the incoming symbol streams to recover the originally transmitted symbols. Again, it is assumed that all base stations 10 are synchronized to the same clock. Following the FFT processing, the k-th output of the FFT processors 60 of the receive chain j for the mobile terminal is represented by:

$$r_{k,j}(t) = \sum_{i=1}^{n} \alpha_{i,j,B_l}(t) c_{k,i,B_l}(t) +$$

$$\sum_{B_{l'}} \sum_{i+1}^{n} \alpha_{i,j,B_{l'}}(t) c_{k,i,B_{l'}}(t) + \eta_{k,j}(t) \qquad \text{Eq. 8}$$

where base station $B_{l'}$ runs in the set of all the neighboring base stations. In particular, $$r_{k,j}(0) = \alpha_{1,j,B_l}(0) s_{k,1,B_l}(0) + \alpha_{2,j,B_l}(0) s_{k,2,B_l}(0) + \qquad \text{Eq. 9}$$

$$\sum_{B_{l'}} \left( \alpha_{1,j,B_{l'}}(0) s_{k,1,B_{l'}}(0) + \alpha_{2,j,B_{l'}}(0) s_{k,2,B_{l'}}(0) \right) + \eta_{k,j}(0)$$

and $$r_{k,j}(T) = -\alpha_{1,j,B_l}(T) s^*_{k,2,B_l}(0) + \alpha_{2,j,B_l}(T) s^*_{k,1,B_l}(0) + \qquad \text{EQ 10}$$

$$\sum_{B_{l'}} \left( -\alpha_{1,j,B_{l'}}(T) s^*_{k,2,B_{l'}}(0) + \alpha_{2,j,B_{l'}}(T) s^*_{k,1,B_{l'}}(0) \right) + \eta_{k,j}(T)$$

It is safe to assume that $\alpha_{i,j,B_l}(0)$ is approximately $\alpha_{i,j,B_l}(T)$ for i=1 and 2 and that $\alpha_{i,j,B_{l'}}(0)$ is approximately $\alpha_{i,j,B_{l'}}(T)$ for l' not equal to l and i=1 and 2. This is the equivalent to assuming that the transmission channels from the base stations antennas 20 to mobile terminal antennas 34 do not change significantly over a period of two OFDM symbols. This is a reasonable assumption given the parameters of practical OFDM systems and the speed of travel for mobile terminals 24. For notational simplicity, let $$h_{i,j,l} = \alpha_{i,j,B_l}(0) = \alpha_{i,j,B_l}(T) \qquad \text{Eq. 11}$$

and $$h_{i,j,l'} = \alpha_{i,j,B_{l'}}(0) = \alpha_{i,j,B_{l'}}(T), \qquad \text{Eq. 12}$$

then the above equations can be rewritten as follows:

$$r_{k,j}(0) = h_{1,j,l} s_{k,1,B_l}(0) + h_{2,j,l} s_{k,2,B_l}(0) + \qquad \text{Eq. 13}$$

$$\sum_{l'} \left( h_{1,j,l'} s_{k,1,B_{l'}}(0) + h_{2,j,l'} s_{k,2,B_{l'}}(0) \right) + \eta_{k,j}(0)$$

and $$r_{k,j}(T) = -h_{1,j,l} s^*_{k,2,B_l}(0) + h_{2,j,l} s^*_{k,1,B_l}(0) + \qquad \text{EQ 14}$$

$$\sum_{l'} \left( -h_{1,j,l'} s^*_{k,2,B_{l'}}(0) + h_{2,j,l'} s^*_{k,1,B_{l'}}(0) \right) + \eta_{k,j}(T),$$

letting $$H_{j,l} = \begin{pmatrix} h_{1,j,l} & h_{2,j,l} \\ -h^*_{2,j,l} & h^*_{1,j,l} \end{pmatrix}; \qquad \text{Eq. 15}$$

$$H_{j,l'} = \begin{pmatrix} h_{1,j,l'} & h_{2,j,l'} \\ -h^*_{2,j,l'} & h^*_{1,j,l'} \end{pmatrix}; \qquad \text{Eq. 16}$$

$$s_{k,l} = \begin{pmatrix} s_{k,1,B_l}(0) \\ s_{k,2,B_l}(0) \end{pmatrix}; \qquad \text{Eq. 17}$$

$$s_{k,l'} = \begin{pmatrix} s_{k,1,B_{l'}}(0) \\ s_{k,2,B_{l'}}(0) \end{pmatrix}; \qquad \text{Eq. 18}$$

$$\eta_{k,j} = \begin{pmatrix} \eta_{k,j}(0) \\ \eta^*_{k,j}(T) \end{pmatrix}; \qquad \text{Eq. 19}$$

and $$r_{k,j} = \begin{pmatrix} r_{k,j}(0) \\ r^*_{k,j}(T) \end{pmatrix}. \qquad \text{Eq. 20}$$

The above equation can be further rewritten as follows:

$$r_{k,j} = H_{j,l} s_{k,l} + \sum_{l'} H_{j,l'} s_{k,l'} + \eta_{k,j} \qquad \text{Eq. 21}$$

for j=1, 2, . . . m.

For m=2, and one interfering base station $B_{l'}$, the above equations are similar to the equations 15 and 19 of the previously mentioned Naguib et al. reference. Naguib et al. focuses on time division multiple access (TDMA) systems where synchronization of the interfering and the desired signals is extremely difficult. Naguib et al. proves that assuming perfect synchronization of the interfering and the desired signals, given m greater than or equal to 1 receive antennas, the mobile terminal 24 is able to completely suppress signals transmitted from all the transmit antennas of k less than m interfering base stations 10 while obtaining a diversity advantage of 2(m−k). A simple zero forcing function algorithm is also provided by Naguib et al. The method preserves the benefits of transmit diversity for each user while suppressing the interference. Furthermore, a minimum mean squared error (MMSE) interference suppression algorithm provided by Naguib et al. that reduces the interference from interfering base stations 10 can provide better performance than the aforementioned zero forcing function when the SINR of the remote base station is relatively large.

Because the OFDM approach when combined with the use of space-time block codes provides perfect synchronization of the interfering and desired signals, all of the methods proposed in Naguib et al. readily apply to the present invention. Although the algorithms proposed by Naguib et al. are proposed for TDMA systems, it turns out that they are more natural to an OFDM framework, since OFDM naturally provides synchronization of the interfering and desired signals. The MMSE approach of Naguib et al. has the zero forcing approach as its subset and is therefore uniformly applicable to the mobile terminals 24 closer to the border of neighboring cells as well as the mobile terminals 24 enjoying stronger SINR.

Alternative techniques are available to those skilled in the art for joint detection of the desired and interfering signals. Such techniques have been extensively studied in the context of joint decoding and multi-user detection for TDMA and CDMA systems. Nonetheless, they are difficult to implement in these frameworks because of the lack of synchronization of the interfering and desired signals. Zero forcing and MMSE solutions in light of diversity are highlighted below.

With particular reference to FIG. 6, assume m=n=2 and that there is only one dominant interference. With these assumptions, the received signal vector $r_{k,1}$ at the first antenna i(34) is represented by:

$$r_{k,1} = \begin{bmatrix} r_{k,1,j} \\ r^*_{k,1,j+1} \end{bmatrix} \quad \text{Eq. 22}$$

$$= \underbrace{\begin{bmatrix} h_{1,1,l} & h_{2,1,l} \\ h^*_{2,1,l} & -h^*_{1,1,l} \end{bmatrix}}_{H_{1,l}} \underbrace{\begin{bmatrix} s_{k,l,1} \\ s_{k,l,2} \end{bmatrix}}_{s_{k,l}} +$$

$$\underbrace{\begin{bmatrix} h_{1,1,l'} & h_{2,1,l'} \\ h^*_{2,1,l'} & -h^*_{1,1,l'} \end{bmatrix}}_{H_{1,l'}} \underbrace{\begin{bmatrix} s_{k,l',1} \\ s_{k,l',2} \end{bmatrix}}_{s_{k,l'}} + \underbrace{\begin{bmatrix} \eta_{k,1,j} \\ \eta_{k,1,j+1} \end{bmatrix}}_{\eta_{k,1}}$$

Similarly, the received signal vector $r_{k,2}$ at the second antenna 34 is represented by:

$$r_{k,2} = \begin{bmatrix} r_{k,2,j} \\ r^*_{k,2,j+1} \end{bmatrix} \quad \text{Eq. 23}$$

$$= \underbrace{\begin{bmatrix} h_{1,2,l} & h_{2,2,l} \\ h^*_{2,2,l} & -h^*_{1,2,l} \end{bmatrix}}_{H_{2,l}} \underbrace{\begin{bmatrix} s_{k,l,1} \\ s_{k,l,2} \end{bmatrix}}_{s_{k,l}} +$$

$$\underbrace{\begin{bmatrix} h_{1,2,l'} & h_{2,2,l'} \\ h^*_{2,2,l'} & -h^*_{1,2,l'} \end{bmatrix}}_{H_{2,l'}} + \underbrace{\begin{bmatrix} \eta_{k,2,j} \\ \eta_{k,1,j+1} \end{bmatrix}}_{\eta_{k,2}}$$

The information sequences of the desired user ($s_{k,l}$) or both users ($s_{k,l}$ and $s_{k,l'}$), with lower bit error probability is estimated as follows using the zero-forcing function or MMSE techniques. For the zero-forcing function, the estimation is given as follows:

$$\begin{bmatrix} \hat{s}_{k,l} \\ \hat{s}_{k,l'} \end{bmatrix} = W_1 \begin{bmatrix} r_{k,1} \\ r_{k,2} \end{bmatrix} = \begin{bmatrix} H^H H & 0 \\ 0 & G^H G \end{bmatrix} \begin{bmatrix} s_{k,l} \\ s_{k,l'} \end{bmatrix} + \begin{bmatrix} \tilde{\eta}_{k,1} \\ \tilde{\eta}_{k,2} \end{bmatrix} \quad \text{Eq. 24}$$

where $$W_1 = \begin{bmatrix} H^H & 0 \\ 0 & G^H \end{bmatrix} \begin{bmatrix} I & H_{1,l'}(H_{2,l'})^{-1} \\ -H_{2,l}(H_{1,l})^{-1} & I \end{bmatrix} \in C^{4 \times 4}$$

$$H = H_{1,l} - H_{1,l'}(H_{2,l'})^{-1} H_{2,l}$$

$$G = H_{2,l} - H_{2,l'}(H_{1,l})^{-1} H_{1,l'}$$

For the MMSE technique, the estimation is given as follows:

$$\hat{s}_{k,l} = W_2^H \begin{bmatrix} r_{k,1} \\ r_{k,2} \end{bmatrix} \quad \text{Eq. 25}$$

where $$W_2 = (R_{xx} + \gamma I)^{-1} \begin{bmatrix} H_{1,l} \\ H_{2,l} \end{bmatrix} \in C^{4 \times 2}$$

$$R_{xx} = \varepsilon \left\{ \begin{bmatrix} r_{k,1} \\ r_{k,2} \end{bmatrix} \begin{bmatrix} r_{k,1} \\ r_{k,2} \end{bmatrix}^H \right\}$$

$$= \begin{bmatrix} H_{1,l} & H_{1,l'} \\ H_{2,l} & H_{2,l'} \end{bmatrix} \begin{bmatrix} H_{1,l} & H_{1,l'} \\ H_{2,l} & H_{2,l'} \end{bmatrix}^H + \tau^2 I$$

The parameter γ in equation 25 is a diagonal loading factor, which is used to prevent singularity due to the matrix inversion and improve performance.

In essence, the received signal sample is stacked at time j and j+1 at both antennas, and can be modeled by equations 22 and 23. In real life, transmitted symbols (or constellation points, $s_{k,l,1}$ and $s_{k,l,2}$) are multiplied by the channel coefficients $h_{1,1,l}$, $h_{1,2,l}$, $h_{2,1,l}$, and $h_{2,2,l}$, from the base station $B_l$ to the mobile terminal 24. Then noise will be added and its variance is $\tau^2$. The concepts are the same from base station $B_{l'}$ to the mobile terminal 24.

The present invention provides a communication system and technique with no frequency reuse where at least the transmission in downlink employs OFDM. The invention provides effortless synchronization of the interfering and the desired signals. Space-time block coding is incorporated at the base stations 10 with interference cancellation techniques, appropriate for space-time block coding at the mobile terminals 24. Accordingly, the OFDM framework facilitates significantly improved suppression of interference from neighboring base stations 10 while achieving antenna diversity. The improvements result in the ability to provide higher data rates within a given spectrum of a wireless communication environment. Although it is preferable to employ OFDM in the downlink, the uplink may incorporate any technology, including CDMA and TDMA, as well as the OFDM techniques of the present invention.

Those skilled in the art will recognize improvements and modifications to the preferred embodiments of the present invention. All such improvements and modifications are considered within the scope of the concepts disclosed herein and the claims that follow.

What is claimed is:

1. A wireless communication system supporting orthogonal frequency division multiplexing (OFDM) having a base station comprising:
   a) a quadrature modulator adapted to generate symbols from data to be transmitted;
   b) a symbol encoder adapted to encode the symbols based on space and time wherein constellation position and timing of the symbols are affected to provide a plurality of series of encoded symbols;
   c) transform circuitry adapted to provide a type of inverse Fourier Transform (ITF) on each of the plurality of series of encoded symbols to provide a series of ITF symbols; and
   d) a plurality of transmission paths, each of which being coupled to one of a plurality of antennas and adapted to modulate one of the series of IFT symbols for transmission from one of the plurality of antennas to provide spatial diversity.

2. The wireless communication system of claim 1 wherein the base station further comprises cyclic extension circuitry in each of the plurality of transmission paths and adapted to receive and add cyclic extensions to the ITF symbols prior to modulation and transmission.

3. The wireless communication system of claim 1 wherein the base station further comprises data encoding circuitry adapted to receive and process the data to be transmitted prior to modulation by the quadrature modulator to facilitate error correction or detection by a receiver of the transmitted data.

4. The wireless, communication system of claim 1 further comprising at least one additional base station configured like the base station wherein a frequency reuse factor wit respect to the base station and the at least one additional base station is approximately one (1).

5. The wireless communication system of claim 4 wherein the base station and the at least one additional base station are synchronized to a cannon clock signal.

6. A wireless communication method supporting orthogonal frequency division multiplexing (OFDM) comprising:
   a) quadrature modulating data to be transmitted into symbols;
   b) encoding the symbols based on space and time wherein constellation position and timing of the symbols are affected to provide a plurality of series of encoded symbols;
   c) providing a type of inverse Fourier Transform (IFT) on each of the plurality of series of encoded symbols to provide a series of IFT symbols;
   d) modulating each of the series of IFT symbols to provide a plurality of modulated signals; and
   e) transmitting each of the plurality of modulated signals from one of a respective plurality of antennas to provide spatial diversity.

7. The wireless communication method of claim 6 further comprising adding cyclic extensions to the IFT symbols prior to modulation and transmission.

8. The wireless communication method of claim 6 further comprising receiving and processing the data to be transmitted prior to modulation by the quadrature modulator to facilitate error correction or detection by a receiver of the transmitted data.

9. The wireless communication method of claim 6 further comprising providing the method from a plurality of base stations wherein a frequency reuse factor with respect to the plurality of base stations is approximately one (1).

10. The wireless communication method of claim 9 wherein each of the plurality of base stations are synchronized to a common clock signal.

11. A wireless communication system supporting orthogonal frequency division multiplexing (OFDM) comprising:
   a) means for quadrature modulating data, to be transmitted into symbols;
   b) means for encoding to symbols based on space and time wherein constellation position and timing of the symbols are affected to provide a plurality of series of encoded symbols;
   c) means for providing a type of inverse Fourier Transform (IFT) on each of the plurality of series of encoded symbols to provide a series of IFT symbols;
   d) means for modulating each of the series of IFT symbols to provide a plurality of modulated signals; and
   e) means for transmitting each of the modulated signals from one of a respective plurality of antennas to provide spatial diversity.

12. The wireless communication system of claim 11 further comprising means for adding cyclic extensions to the IFT symbols prior to modulation and transmission.

13. The wireless communication system of claim 11 further comprising means for receiving and processing the data to be transmitted prior to modulation by the quadrature modulator to facilitate error correction or detection by a receiver of the transmitted data.

14. A wireless communication system supporting orthogonal frequency division multiplexing (OFDM) comprising:
   a) a plurality of antennas to provide spatial diversity;
   b) a plurality of receiving paths, each of which being coupled to one of the plurality of antennas and adapted to demodulate received signals to provide a plurality of series of inverse Fourier Transform (IFT) symbols;
   c) transform circuitry adapted to receive each of the plurality of series of IFT symbols from each of the plurality of receiving paths and provide a type of Fourier Transform (FT) on each of the plurality of series of IFT symbols to provide a plurality of series of encoded symbols mixed with interfering signals;
   d) interference cancellation circuitry adapted to estimate each of the plurality of series of encoded symbols and cancel the interfering signals to provide each of the plurality of series of encoded symbols;
   e) a symbol decoder adapted to decode each of the plurality of series of encoded symbols based on space and time wherein constellation position and timing of the symbols are affected during encoding to provide a series of symbols; and
   f) a quadrature demodulator adapted to demodulate the series of symbols into data corresponding to that originally transmitted.

15. The wireless communication system of claim 14 further comprising cyclic extension circuitry in each of the plurality of receiving paths and adapted to receive and remove cyclic extensions from the plurality of series of IFT symbols prior to providing the type of Fourier Transform.

16. The wireless communication system of claim 14 further comprising data decoding circuitry adapted to receive and process the data to provide error correction or detection.

17. A wireless communication method supporting orthogonal frequency division multiplexing (OFDM) comprising:
   a) receiving signals from a plurality of antennas at a plurality of receiving paths;

b) demodulating the signals in each of the plurality of receiving paths to provide a plurality of series of inverse Fourier Transform (IFT) symbols;

c) providing a type of Fourier Transform (FT) on each of the plurality of series of IFT symbols to provide a plurality of series of encoded symbols mixed with interfering signals;

d) estimating each of the plurality of series of encoded symbols and canceling the interfering signals to provide each of the plurality of series of encoded symbols;

e) decoding each of the plurality of series of encoded symbols based on space and time wherein constellation position and timing of the symbols are affected during encoding to provide a series of symbols; and f) demodulating the series of symbols into data corresponding to that originally transmitted.

18. The wireless communication method of claim 17 further comprising receiving and removing cyclic extensions from the plurality of series of IFT symbols prior to providing the type of Fourier Transform.

19. The wireless communication method of claim 17 further comprising receiving and processing the data to provide error correction or detection.

20. A wireless communication system supporting orthogonal frequency division multiplexing (OFDM) comprising:

a) means for receiving signals from a plurality of antennas at a plurality of receiving paths;

b) means for demodulating the signals in each of the plurality of receiving paths to provide a plurality of series of inverse Fourier Transform (IFT) symbols;

c) means for providing a type of Fourier Transform (FT) on each of the plurality of series of IFT symbols to provide a plurality of series of encoded symbols mixed with interfering signals;

d) means for estimating each of the series of encoded symbols and canceling the interfering signals to provide each of the series of encoded symbols;

e) means for decoding each of the plurality of series of encoded symbols based on space and time wherein constellation position and timing of the symbols are affected during encoding to provide a plurality of series of symbols; and f) means for demodulating the series of symbols into data corresponding to that originally transmitted.

21. The wireless communication system of claim 20 further comprising means for receiving and removing cyclic extensions from the plurality of IFT symbols prior to providing the type of Fourier Transform.

22. The wireless communication system of claim 20 further comprising means for receiving and processing the data to error correction or detection.

* * * * *